UNITED STATES PATENT OFFICE.

THOMAS A. EDISON, OF MENLO PARK, NEW JERSEY.

ART OF MALLEABLEIZING IRON.

SPECIFICATION forming part of Letters Patent No. 273,715, dated March 13, 1883.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in the Art of Malleableizing Cast-Iron; and I do hereby declare that the following is a full and exact description of the same.

My invention relates to the art of rendering cast-iron malleable; and it consists in a new and improved process or method of decarbonizing articles made of cast-iron to the extent necessary to give to the iron the desired degree of malleability.

This improved process or method may be stated in general terms as consisting in removing from the iron by exhaustion and while at a high heat as large a per cent. as possible of the air or gases occluded within its pores, and then replacing such air or gases with an active carbon-reducing agent, to the end that the carbon be speedily eliminated, it uniting with the reducing agent to form a gaseous compound.

In carrying this process into practice I prefer to proceed as follows: The iron article or articles to be rendered malleable are placed in a pot or flask capable of standing a high degree of heat and provided with a connection to an air-pump, so that the air may be exhausted therefrom, and also provided with a connection to a source of supply of a reducing-gas. The pot or flask is also so constructed that it may be closed air-tight. The article or articles are placed in the pot or flask, which is then closed air-tight and subjected to heat sufficient to bring the articles to a white or nearly white heat, whereupon the air is exhausted by the pump from the pot or flask to as great a degree as is readily attainable, the same degree of vacuum of course existing within the pores of the iron. A charge of the active reducing agent chosen in a gaseous state is then admitted to the pot or flask, replacing the extracted gas or air in the pores of the iron, thereby being brought into intimate contact with the carbon and eliminating it by combustion in whole or in part. With very small articles the one exhaustion and one charging so far described might suffice. In practice, however, it is preferable to again exhaust the pot or flask and again charge with the reducing agent and to repeat this sequence of operations until proper malleableization is attained, the heat being kept up constantly during the operations. Good and speedy results are had by using as the carbon-reducing agent oxygen or an oxidizing-gas, which under some conditions may be common air.

The operation of the process may be stated as follows, supposing for the sake of illustrating that an oxidizing agent be employed: The heating opens more freely the physical and mechanical pores of the cast-iron, exposing more fully the carbon in the iron for the action of the agent, while at the same time it tends to expel therefrom a part of the air or other occluded gas, if such there be, by rarefying it. The exhaustion almost completely empties these pores, leaving them in condition to be filled by any gaseous matter presented. On the charge being admitted, it fills them, the oxygen unites with the carbon immediately, in view to form carbonic oxide or acid, which tends to remain in the pores. If the process stopped here, it would so remain, except as displaced by the further diffusion of the oxidizing agent—a slow process. Therefore the pot or flask is again exhausted, and a fresh charge admitted. The results are that cast-iron is rendered malleable in a very short time, the time of treatment being at the most only hours where days are required with the old processes, the malleableization being more thorough and at less cost. After the proper degree of malleability has been attained it is preferable that the articles should for a few minutes be raised to a higher degree of heat than that used during the process.

What I claim is—

1. The improvement in the art of rendering solid cast-iron malleable, which consists in heating the iron to a high heat, then exhausting mechanically any air or occluded gas therefrom, and then charging the iron with an active carbon-reducing agent in gaseous form, substantially as set forth.

2. The improved process of treating solid cast-iron to render it malleable, consisting in inclosing it in an air-tight pot or flask, heating the cast-iron therein, exhausting the air therefrom, and then charging the same with an active carbon-reducing agent in gaseous form, substantially as set forth.

3. The improved process of treating solid cast-iron to render it malleable, consisting in inclosing it in an air-tight pot or flask, heating the cast-iron therein, exhausting the flask and then charging the same with an active carbon-reducing agent in gaseous form, again exhausting and charging, the two latter operations being repeated as often as necessary, the cast-iron being meanwhile maintained at a high heat, substantially as set forth.

This specification signed and witnessed this 4th day of October, 1881.

THOS. A. EDISON.

Witnesses:
H. W. SEELY,
RICHD. A. DYER.